United States Patent [19]

Fox

[11] 4,260,032
[45] Apr. 7, 1981

[54] WELL DRILLING TOOL

[75] Inventor: Fred K. Fox, Austin, Tex.

[73] Assignee: Engineering Enterprises, Inc., Houston, Tex.

[21] Appl. No.: 97,133

[22] Filed: Nov. 26, 1979

[51] Int. Cl.³ .............................................. E21B 4/02
[52] U.S. Cl. .................................. 175/107; 175/228; 415/104; 415/113; 415/502
[58] Field of Search ............... 175/107, 228; 415/502, 415/503, 110–113, 104, 107

[56] References Cited

U.S. PATENT DOCUMENTS

| 1,270,808 | 7/1918 | Franklin | 415/503 |
| 2,592,519 | 4/1952 | Postlewaite | 415/107 |
| 3,741,321 | 6/1973 | Slover et al. | 175/228 X |
| 4,019,591 | 4/1977 | Fox | 175/107 |
| 4,080,094 | 3/1978 | Jeter | 415/113 X |

Primary Examiner—Ernest R. Purser
Attorney, Agent, or Firm—Marvin B. Eickenroht; Jennings B. Thompson

[57] ABSTRACT

There is disclosed a turbodrill having an axial thrust bearing section which is contained within a lubricant chamber arranged within an annular space between the case and shaft of the turbodrill above the turbine section, and which is defined between means sealing between the shaft and the case which, in use of the turbodrill, are above the drilling fluid circulating therethrough.

1 Claim, 1 Drawing Figure

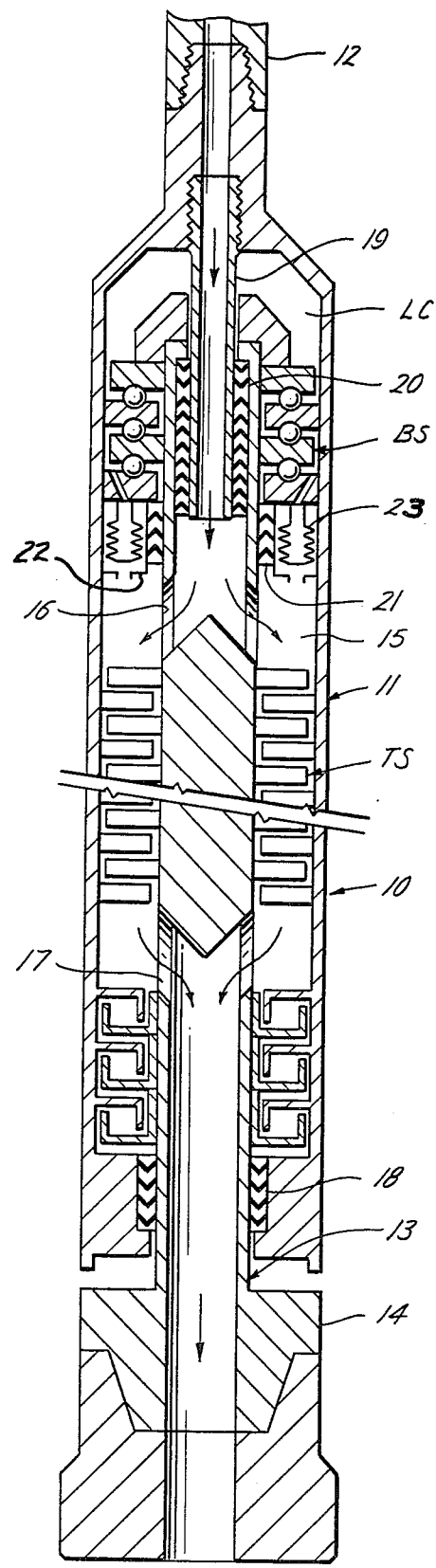

WELL DRILLING TOOL

This invention relates generally to well drilling tools of the type known as "turbodrills" wherein a bit is suspended on the lower end of a shaft which is in turn supported within a case suspended from the lower end of a drill string, and a turbine motor is arranged within an annular space between the case and shaft to cause the shaft and bit to rotate with respect to the case and string in response to the circulation of drilling fluid downwardly through the drill string and motor and out the bit. More particularly, it relates to improvements in tools of this type wherein the shaft is supported from the case by means of an axial thrust bearing section which is arranged within the space above the turbine section.

In the prior turbodrill shown, for example, in U.S. Pat. No. 3,971,450, assigned to the assignee of the present application, the axial thrust bearing section is arranged in a portion of the annular space between the shaft and case which is beneath the turbine secion. This lower portion of the shaft is thus in compression, which may cause it to buckle. It has therefore been proposed to arrange the turbine section in a lower portion of the space beneath the bearing section, so that the upper portion of the shaft which is supported by the bearing section is instead in tension.

However, in prior turbodrills of this latter construction, the bearings are lubricated by drilling fluid as it circulates through the tool. Due to the abrasive nature of the drilling fluid, the bearings are quickly worn and require frequent replacement. It would therefore be advantageous to provide a turbodrill of such construction in which the bearings are contained within a lubricant chamber within the annular space of the tool in order to protect them from the drilling fluid.

However, those skilled in this art are aware of the problems which are encountered in maintaining the seals between the case and shaft which are required to contain lubricant. These, of course, stem not only from the abrasive nature of the drilling fluid, but also from the fact that it is normally considerably heavier than the lubricant, and often contains barite or other heavy particles which, as the tool vibrates, impart a substantial downward force on the seal at the upper end of the lubricant chamber. The primary object of this invention is to provide such a turbodrill in which these problems are overcome, and, more particularly, in which the bearings are contained within a lubricant chamber which is so arranged and constructed as to avoid these damaging effects on the seals.

This and other objects are accomplished, in accordance with the illustrated embodiment of the invention, by a turbodrill of the type described wherein the case has an extension which fits within the upper end of the shaft so as to permit drilling fluid circulated downwardly through the drill string to pass into the upper end of the shaft, and the axial thrust bearing section which supports the shaft for rotation with respect to the case is disposed within the annular space between the upper end of the shaft and the case. More particularly, means are provided for sealing between the shaft and the extension in the case as well as between the shaft and the case beneath the bearing section in order to form the lubricant chamber in which the bearings are contained. A first port connects the upper end of the shaft with the space intermediate the so formed lubricant chamber and the turbine section within the annular space beneath the bearing section, a second port connects the space beneath the turbine section with the lower end of the shaft above the bit, and additional means are provided for sealing between the shaft and housing beneath the second port, whereby drilling fluid is caused to circulate through the turbine section, in order to rotate the shaft, and then out the lower end of the bit. Means are also provided for equalizing lubricant pressure within the chamber with the pressure of the drilling fluid in response to changes in the latter.

As will be apparent from the foregoing, a turbodrill of the above-described construction accomplishes the primary object of this invention, because, since the heavier drilling fluid is below the seals forming the lubricant chamber, there is much less tendency for the seals to fail and thus permit drilling fluid to enter the lubricant chambers, as compared with conventional arrangements wherein such drilling fluid is above the upper seal forming the lubricant chamber.

The single FIGURE of the drawings is a diagrammatic, vertical, sectional view of a turbodrill constructed in accordance with an illustrative embodiment of the present invention.

With reference now to the details of the above-described drawing, the overall turbodrill, which is indicated in its entirety by reference character 10, comprises a case 11 having its upper end suspended from the lower end of a drill string 12, and a shaft 13 rotatable within the case and having a bit 14 suspended at its lower end. As shown, an annular space 15 is formed between the shaft and case, and the shaft is supported for rotation with respect to the case by means of an axial thrust bearing BS.

A turbine section TS arranged within the annular space 15 is of such construction as to cause the shaft to be rotated with respect to the case in response to the circulation of drilling fluid downwardly through the drill string and tool and out the lower end of the bit. Thus, as known to those skilled in this art, it is possible to rotate the bit within a wellbore without having to transmit torque to the bit through the entire length of the drill string 12. Also, of course, drilling mud which circulates out the lower end of the bit is returned to the surface upwardly within the annulus between the turbodrill and the wellbore.

The upper and lower ends of shaft 13 are hollow and open at the top and bottom, respectively. Also, ports 16 and 17 are formed in the shaft adjacent to the bottom end of its upper portion and the top end of its lower portion, respectively, to connect such hollow portions with the annular space 15. The turbine section TS is mounted on the shaft and case intermediate the ports 16 and 17, and packing 18 is carried by the lower end of the case for sealably engaging the rotating lower end of the shaft above the bit. Consequently, drilling fluid circulating downwardly through the upper portion of the shaft is caused to pass through the turbine section and then back into the lower outer portion of the shaft and out the lower end of the bit.

A tube 19 is connected to and extends downwardly from the upper end of case 11 so as to fit within the hollow upper portion of shaft 13. More particularly, the lower end of the extension is spaced from the portion of the shaft into which it fits so as to receive packing 20 therebetween for sealing between the extension and the shaft. Preferably, the inner diameter of the extension 19 forms a smooth continuation of the bore through the drill string 12.

Additional packing 21 is provided for sealing between the upper portion of the shaft and the case beneath the bearing section BS so as to form lubricant chamber LC between it and the packing 20. More particularly, and as shown, packing 21 is arranged between a collar 22 on the inside of the case beneath the bearing section and the upper portion of the shaft above port 16. When chamber LC is filled with lubricant, the pressure therein is caused to equalize with the pressure of the drilling fluid, as it increases and decreases, by means of a bellows 23 connecting at one end with the interior of the lubricant chamber and exposed at its other end to the space 15 so as to be expandable and contractable in response to changes in the pressure of the drilling fluid.

As previously mentioned, and as will be more readily apparent from the foregoing, the heavier drilling fluid is beneath both the seals 20 and 21 and thus not in a position to damage them as would be the case if it were above one or both of the seals. Furthermore, by equalizing lubricant pressure with that of drilling fluid pressure, the bellows 23 further reduces the likelihood of failure of the seals by insuring little or no pressure differential across them during operation of the tool.

As will be appreciated, the bearing section BS may be made up of a number of axial thrust bearings of conventional construction which, as illustrated, may include roller-type bearings mounted between races carried on the inside of the case and outside of the upper portion of the shaft. As also previously mentioned, since the bearing section is above the turbine section, the portion of the shaft beneath the bearing secion is in tension, rather than in compression, as would be the case if the turbine section were instead above the bearing section.

The turbine section TS is also of a conventional construction well known in the art, including vertically alternate sets of turbine blades mounted on the inside of the case and outside of the intermediate portion of the shaft. As well known in the art, the alternate sets of blades are angled in opposite directions so that the circulation of drilling fluid through the turbine section causes rotation of the shaft with respect to the case.

The lower seal 18 will of course divert drilling fluid which is circulated through the turbine section back through the ports 17 into the lower portion of the shaft 13. Since pressure differential between the drilling fluid inside and outside of the tool 11 is taken across the seal 18, it is preferably protected in a manner disclosed in U.S. Pat. application, Ser. No. 939,908, filed Sept. 5, 1978, by Fred K. Fox, and entitled "Well Drilling Tool" now U.S. Pat. No. Re. 30,257, also assigned to the assignee of the present application namely, by means of a column of material disposed in the annular space above the seal and comprising a grease having heavy metal particles therein so that such material, in addition to being insoluble with respect to the drilling fluid, has a specific gravity considerably higher than that of drilling fluid. Consequently, the possibility of abrasive particles of the drilling fluid penetrating through the column of grease, and thus having access to the rotating seal 18, is reduced to a minimum.

As also shown in the drawing, and as described in detail in copending patent application, Ser. No. 071,797, filed Sept. 4, 1979, by Fred K. Fox, entitled "Well Drilling Tool," and assigned to the assignee of the present application, the heavy material is preferably contained within a series of buckets having overlapping and cooperating parts mounted on the inside of the lower end of the case and outside of the lower end of the shaft.

From the foregoing it will be seen that this invention is one well adapted to attain all of the ends and object hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

The invention having been described, what is claimed is:

1. A turbodrill, comprising a body including a case adapted to be suspended from the lower end of the string and a shaft arranged within the case to define an annular space therebetween and adapted to suspend a bit from its lower end, a bearing section having axial thrust bearings which support the shaft for rotation with respect to the case, an extension on the case fitting within the upper end of the shaft so as to permit drilling fluid circulated downwardly through the drill string to pass into the upper end of the shaft, means sealing between the shaft and the extension on the case as well as the case beneath such bearings in order to form a lubricant chamber in the bearings are contained, a turbine section below the lubricant chamber, a first port connecting the upper end of the shaft with the space intermediate the lubricant chamber and turbine sections, a second port connecting the space beneath the turbine section with the lower end of the shaft above the bit, additional means sealing between the shaft and housing beneath the second port, whereby drilling fluid is caused to circulate through the turbine section, in order to rotate the shaft, and out the lower end of the bit, and means for equalizing lubricant pressure within the chamber with the pressure of the drilling fluid in response to changes in the latter.

* * * * *